(No Model.) 6 Sheets—Sheet 1.
J. P. CLEAL & F. A. REINHARD.
CASH REGISTER AND INDICATOR.
No. 580,378. Patented Apr. 13, 1897.
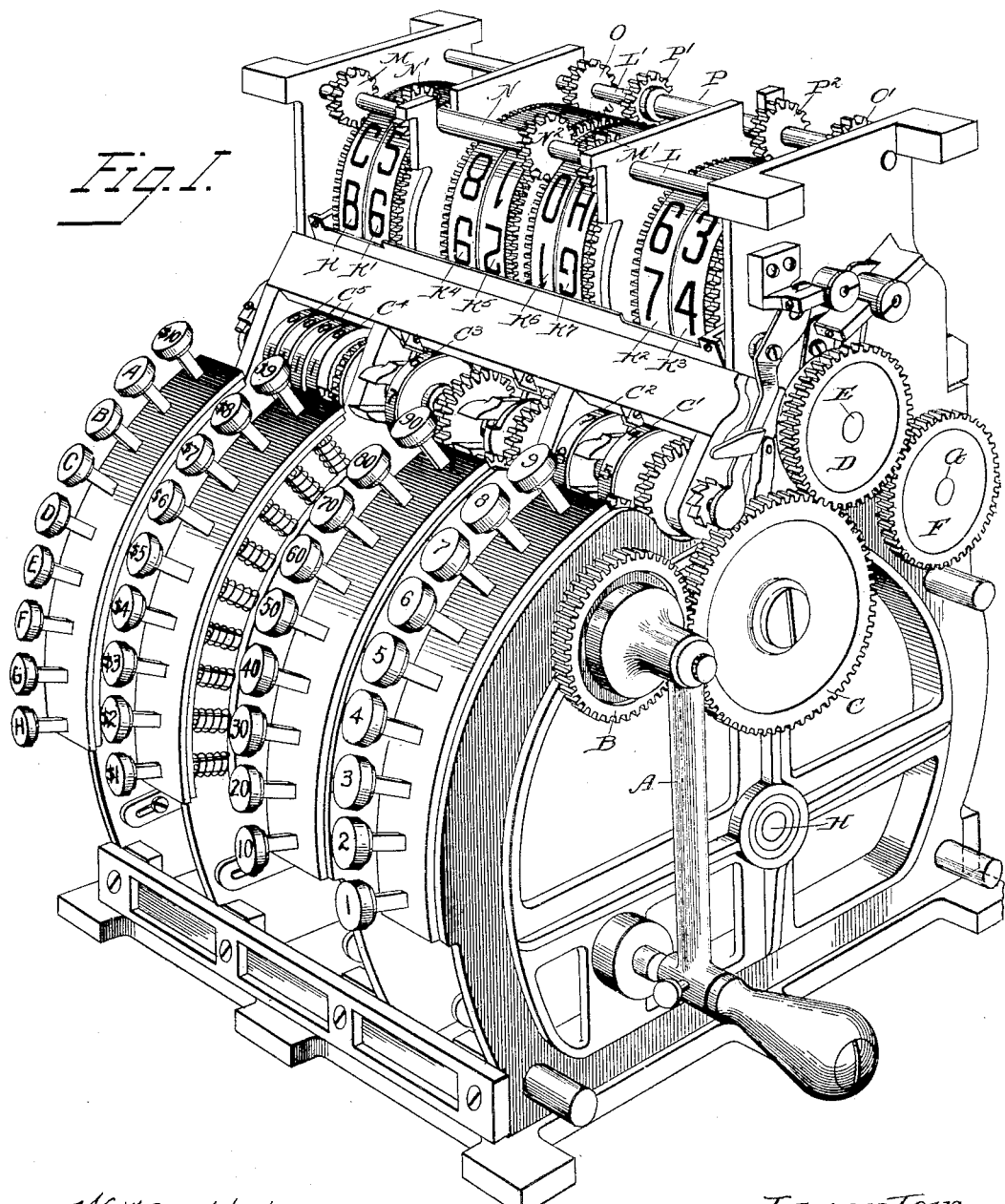
Fig. I.
Witnesses
Martin H. Olsen.
Leonora Vreeman
Inventors
Joseph P. Cleal &
Frank A. Reinhard
by Edward Rector
their atty (No Model.) 6 Sheets—Sheet 2.
J. P. CLEAL & F. A. REINHARD.
CASH REGISTER AND INDICATOR.
No. 580,378. Patented Apr. 13, 1897.
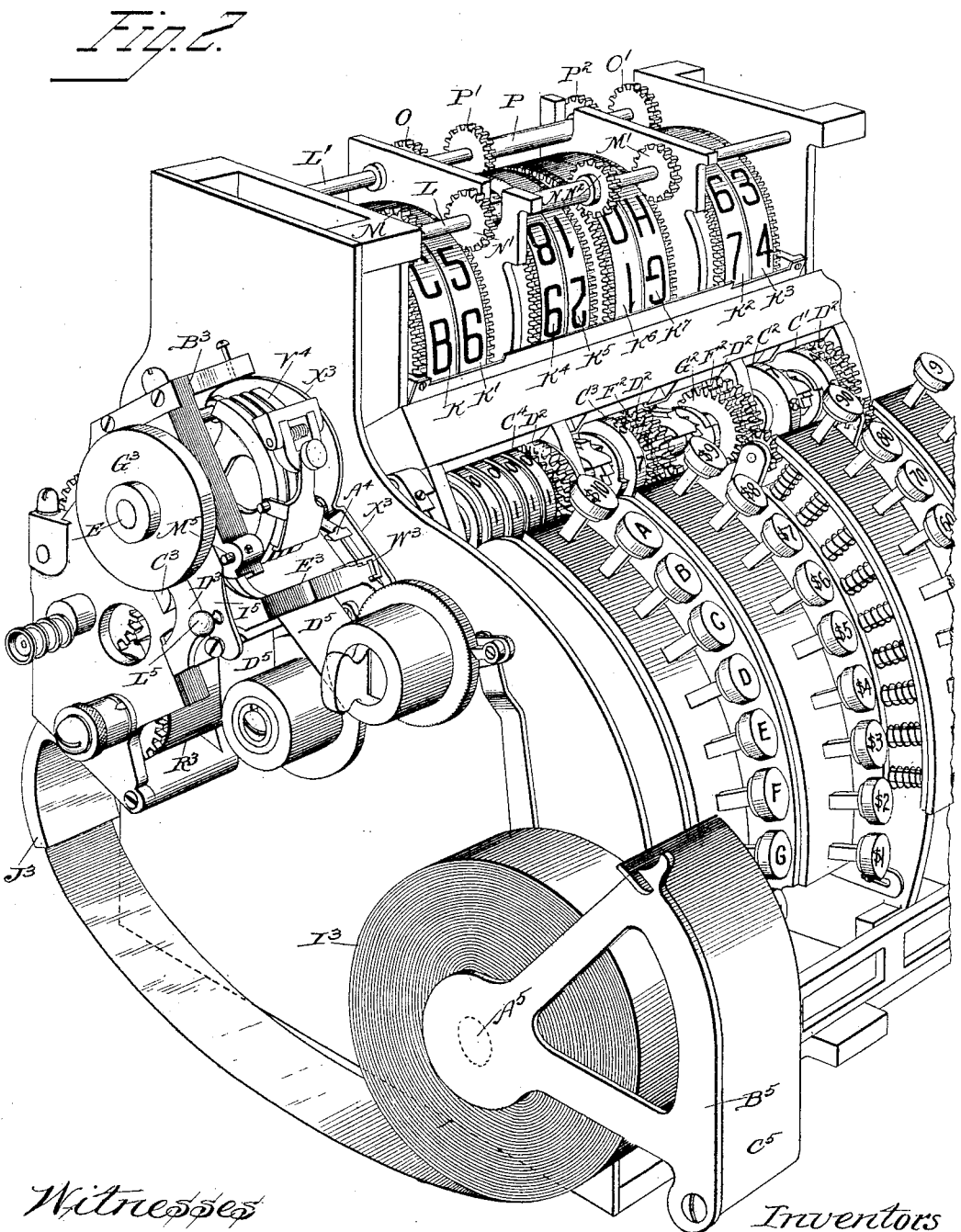

(No Model.) 6 Sheets—Sheet 3.
J. P. CLEAL & F. A. REINHARD.
CASH REGISTER AND INDICATOR.
No. 580,378. Patented Apr. 13, 1897.
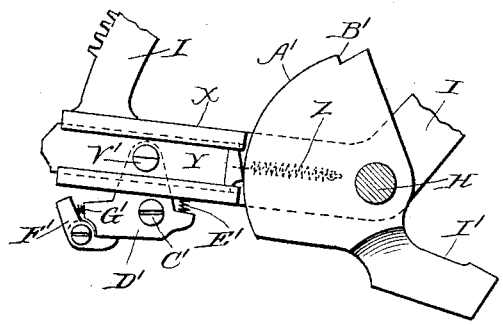
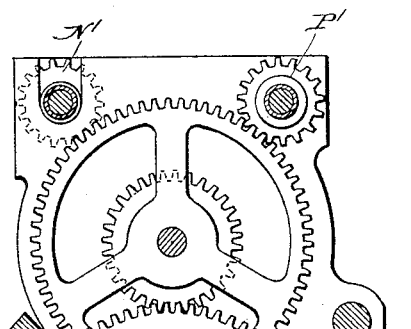
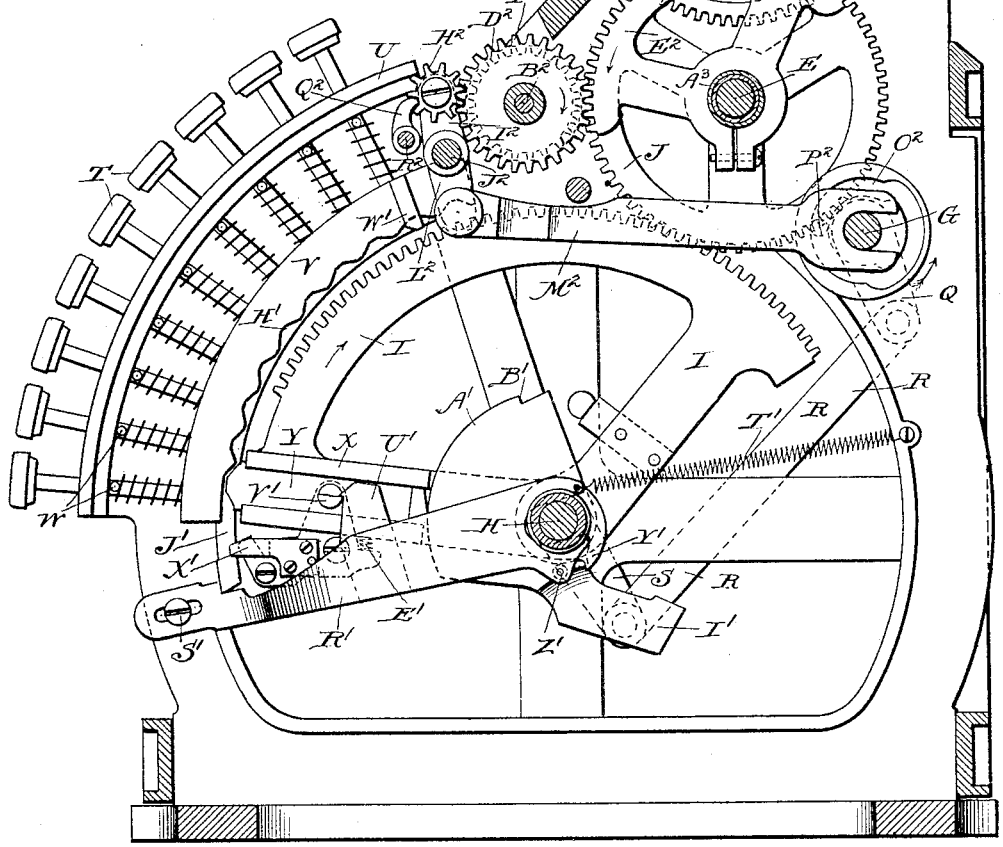
Witnesses
Martin H. Olsen
Lenora Neuman
Inventors
Joseph P. Cleal
Frank A. Reinhard
by Edward Rector
their atty (No Model.) 6 Sheets—Sheet 4.
J. P. CLEAL & F. A. REINHARD.
CASH REGISTER AND INDICATOR.
No. 580,378. Patented Apr. 13, 1897.
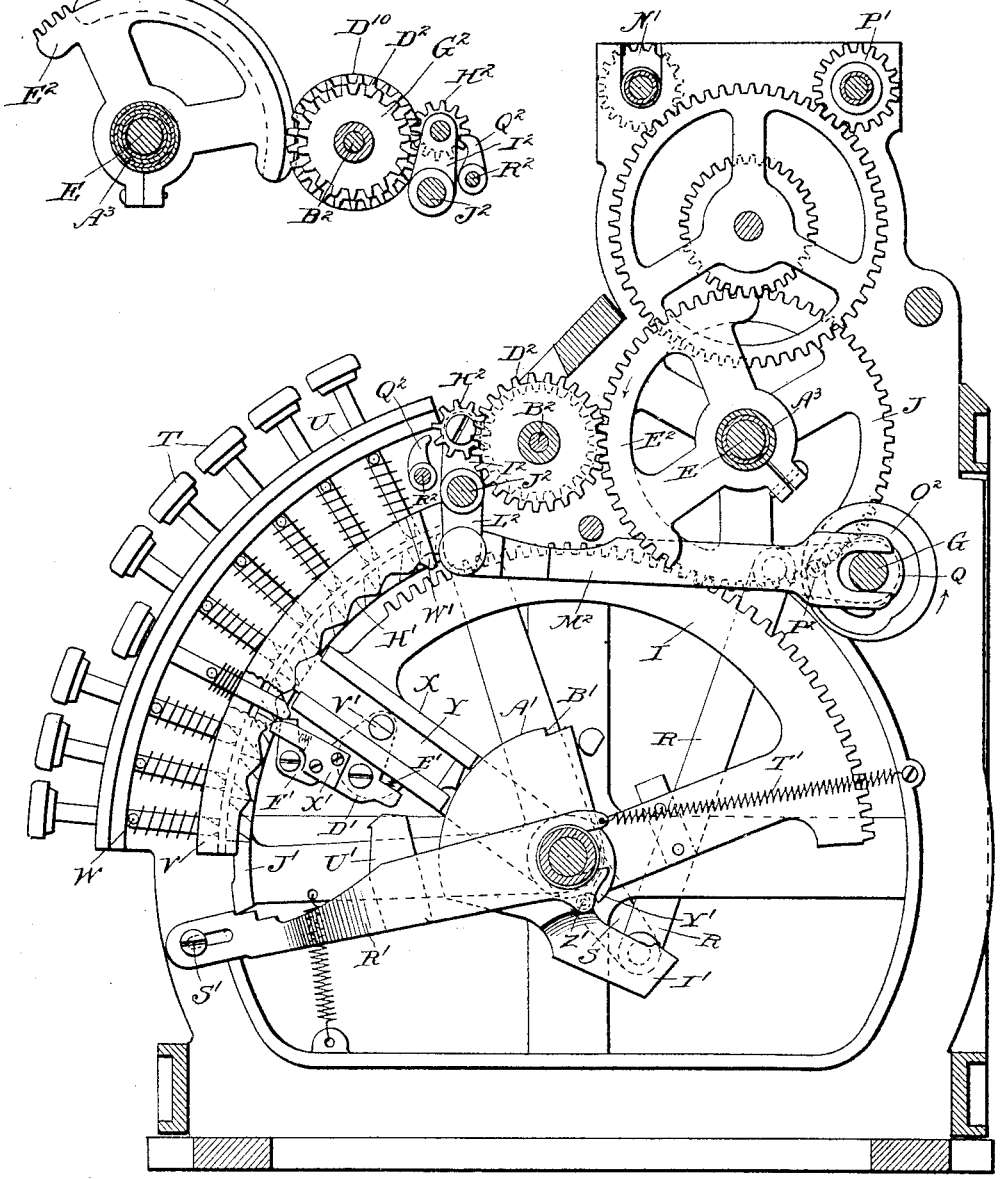

(No Model.) 6 Sheets—Sheet 5.

J. P. CLEAL & F. A. REINHARD.
CASH REGISTER AND INDICATOR.

No. 580,378. Patented Apr. 13, 1897.

Witnesses
Martin H. Olsen.
Lenora Wiseman

Inventors
Joseph P. Cleal
Frank A. Reinhard
by Edward Reitor
their atty (No Model.) 6 Sheets—Sheet 6.

J. P. CLEAL & F. A. REINHARD.
CASH REGISTER AND INDICATOR.

No. 580,378. Patented Apr. 13, 1897.

United States Patent Office.

JOSEPH P. CLEAL AND FRANK A. REINHARD, OF DAYTON, OHIO, ASSIGNORS TO THE NATIONAL CASH REGISTER COMPANY, OF SAME PLACE.

CASH REGISTER AND INDICATOR.

SPECIFICATION forming part of Letters Patent No. 580,378, dated April 13, 1897.

Application filed March 19, 1895. Serial No. 542,414. (No model.)

*To all whom it may concern:*

Be it known that we, JOSEPH P. CLEAL and FRANK A. REINHARD, citizens of the United States, residing at Dayton, in the county of Montgomery and State of Ohio, have invented a certain new and useful Improvement in Cash Registers and Indicators, of which the following is a description, reference being had to the accompanying drawings, forming part of this specification.

Our invention consists in certain improvements upon machines such as that shown and described in Letters Patent of the United States Nos. 464,294 and 483,511 and in pending application, Serial No. 536,516, of Joseph P. Cleal, one of the present applicants. Its novelty will be hereinafter set forth in connection with the description of the machine shown in the accompanying drawings, and be particularly pointed out in the claims.

Figure 5:
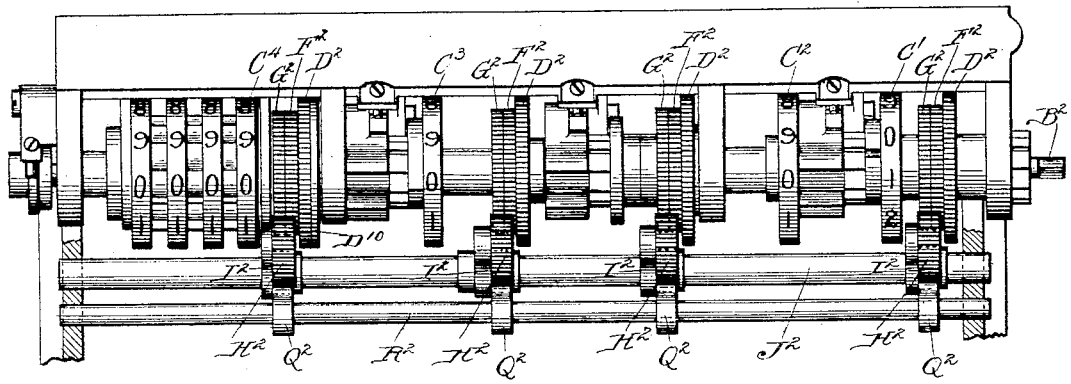
Figure 6:
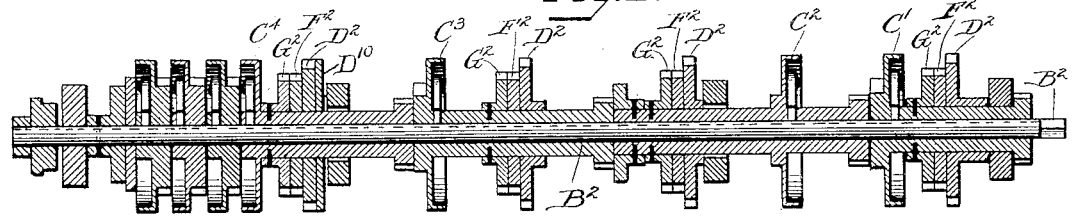
Figure 7:
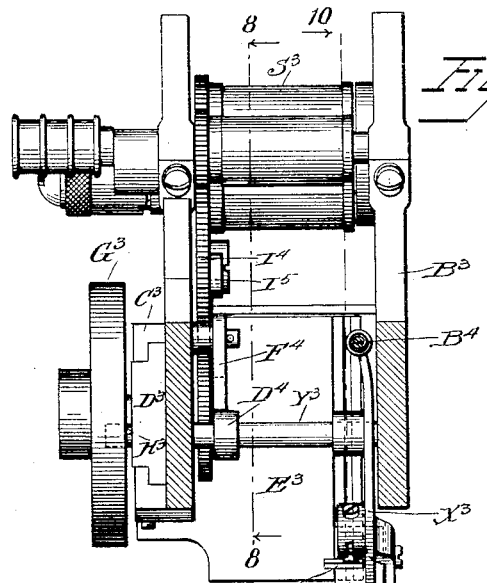
Figure 8:
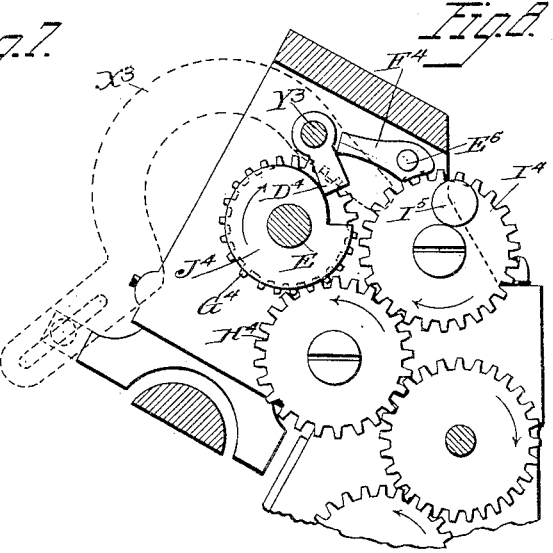
Figure 9:
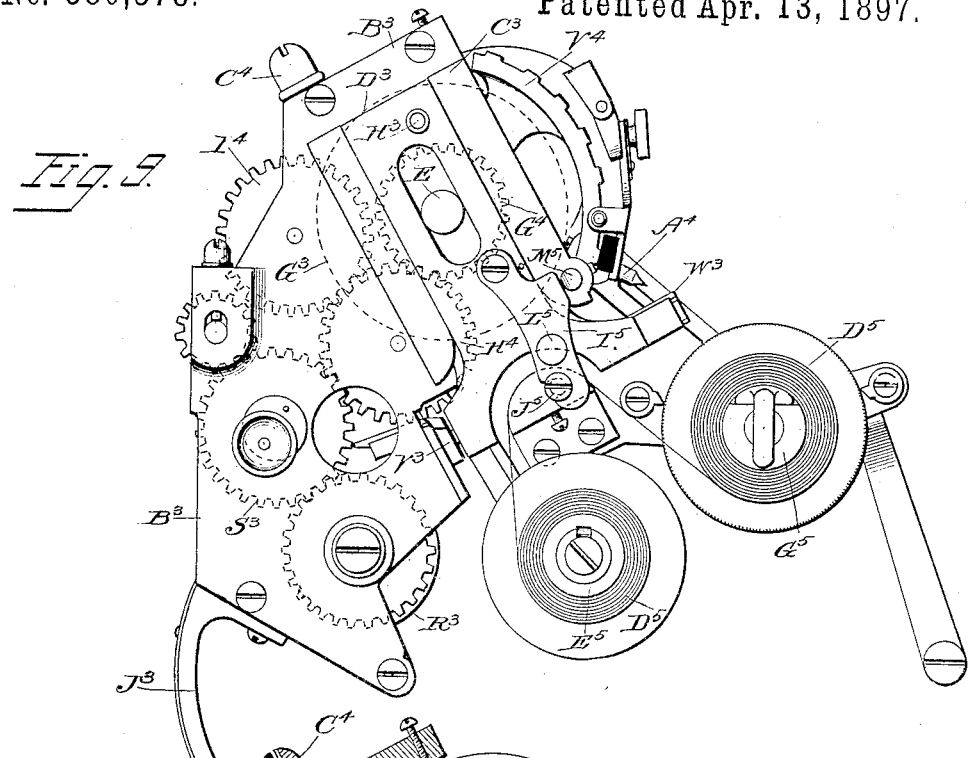

In said drawings, Figure 1 is a perspective view of the machine removed from its casing, looking at its forward right-hand corner; Fig. 2, a corresponding view, looking at its forward left-hand corner, with part of its right-hand corner broken away; Fig. 3, a middle vertical section of the machine, looking toward the left; Fig. 3ª, a detail view of the coupling devices between one of the segments and rock-shaft, with the plate X' of Fig. 3 removed; Fig. 4, a view corresponding to Fig. 3, with the parts in the position they occupy at a point in the latter half of an operation of the machine after the segment has been uncoupled from the rock-shaft and the latter has moved on toward normal position; Fig. 4ª, a detail view of the register-actuating segment belonging to the fourth or left-hand row of keys; Fig. 5, a front view of the train of registering-wheels and coöperating devices; Fig. 6, a vertical section through the train of registering-wheels; Fig. 7, a top view of the supplemental frame on the left-hand side of the machine which supports the printing mechanism, the type-carriers and inking device of such mechanism being removed and the top plate of the supplemental frame cut away; Fig. 8, a detail view approximately on the line 8 8 of Fig. 7; Fig. 9, an elevation of the printing attachment upon the left-hand side of the machine, and Fig. 10 a vertical section thereof approximately on the line 10 10 of Fig. 7.

The same letters of reference are used to designate identical parts in all the drawings.

The hub of the operating-handle A of the machine is loosely mounted upon a stub-shaft projecting from the framework, Fig. 1, and has fast upon it a gear B, which meshes with a second gear C upon a second stub-shaft supported in the framework. The gear C meshes with a gear D, fast upon a rotary shaft E, and gear D meshes with a gear F, fast upon a second rotary shaft G. The shafts E and G extend entirely across the machine to the left side thereof.

Journaled in the lower middle part of the machine and extending entirely across the same is a rock-shaft H. Loosely mounted upon this shaft at about equal distances apart are four gear-toothed segments I, Figs. 3 and 4. Meshing with each segment is a gear-wheel J, by means of which wheels and suitable intermediate gears the four indicator-wheels K, K', K², and K³, Figs. 1 and 2, are geared to the respective segments. These four indicator-wheels are adapted to expose their indicating-numbers to view at the front of the machine, and in order that a similar indication may be exposed at the rear of the machine there are provided four other indicator-wheels K⁴, K⁵, K⁶, and K⁷, having their numbers arranged in reverse position to those upon the first-mentioned wheels, so as to be read from the rear of the machine. Each of the eight wheels has a gear fast to its side or hub.

Journaled in the framework above the wheels are two shafts L L', extending entirely across the machine. Fast upon the shaft L are two pinions M M', meshing, respectively, with the gears of the wheels K and K⁷, by which means those two wheels are geared together and caused to move in unison. Loosely mounted upon the shaft L is a sleeve N, having fast upon its opposite ends pinions N' N², meshing, respectively, with the gears of the wheels K' and K⁶, by which means those two wheels are geared together. The shaft L' has fast upon it two pinions O O', meshing, respectively, with the gears of the wheels K⁴ and K³, by which means those two wheels are geared together, while loosely mounted upon the shaft L' is a sleeve P, having fast upon it two pinions P' P², meshing with the gears of the wheels K⁵ and K², respectively, by which means those two wheels are geared together. In this manner the movement of any one of the indicating-wheels facing forward is caused to move the corresponding wheel facing rearward to effect the same indication at both front and rear of the machine.

Interposed in the shaft G, near its left-hand end, Fig. 3, is a crank Q, which is connected by a pitman R with an arm S, fast upon the rock-shaft H, by which means at each revolution of the operating-handle and shaft G the shaft H is thrown forward and backward a definite distance.

As before stated, the segments I, which are geared to the indicators in the manner before explained, and which also actuate the register in the manner hereinafter described, are loose upon the shaft H, and the latter is caused to impart different degrees of its movement to the indicators and register by connecting the segments I with and disconnecting them from it, and the next feature of our invention consists in improved means for this purpose. As in the prior machines of this character, a latch or coupling device is interposed between each segment and the shaft for this purpose, and each latch coöperates with one of the four sets or series of keys T, mounted radially to the shaft H in suitable guide-plates U V and yieldingly held in and returned to their outer positions by coiled springs surrounding them between the two guide-plates and confined between the plate V and pins W, passed through the stems of the keys.

Formed upon one side of the lower radial supporting-arm of each segment I is a guideway X, Figs. 3, 3ª, and 4, in which fits a sliding latch-plate Y, pulled rearward by a spring Z, connecting it with the segment (dotted lines, Fig. 3ª) and bearing at its rear end against the curved forward edge of a plate A', fast upon the shaft H, there being one of these plates A' beside each segment I. The plate A' is cut away at its upper rear corner to form a shoulder B'. When the shaft H is thrown forward by turning the operating-handle, the curved forward edge of the plate A' moves past the rear end of the latch-plate Y until the shoulder B' clears said plate, whereupon the spring Z pulls the plate Y rearward and causes its rear end to catch over said shoulder. The result of this operation is that just at the end of the forward movement of the rock-shaft H the latter will become coupled to the segment I by means of the plates A' and Y, and during its return backward movement will carry the segment with it until the plate Y is disengaged in some manner from the shoulder B' of the plate A'. The means for effecting this disengagement is the following:

Pivoted at C' to a pendent extension of the segment I, Fig. 3ª, is a bell-crank plate D', whose upper end passes through a slot in the lower wall of the guideway X and is loosely pivoted to the sliding latch-plate Y. The lower horizontal portion of the plate D' extends forward beneath the front end of the guideway X, while in rear of its pivot the plate is provided with a projecting lug, between which and the under side of the guideway X is interposed a spring E'. This spring acts, as does the spring Z, heretofore referred to, to press the latch-plate Y rearward, and one or the other of the springs may be dispensed with without affecting the mode of operation of the parts. Pivoted to the lower corner of the front end of the plate D' is a trip F', whose upper end is pressed outwardly by a spring G', interposed between it and the end of the plate D'. The lower rear end of the trip bears against the under side of the plate D' and limits the outward movement of its upper end under the influence of the spring G', while said upper end of the trip is free to yield inwardly to pressure which will overcome the resistance of the spring G'. Whenever any one of the keys T is pressed inward to its limit of movement, its inner end will be projected into the path of travel of the upper end of the trip F', Fig. 4, so that when, during the backward movement of the segment with the rock-shaft, the trip strikes the end of such key it will be arrested thereby and its pressure against the key will rock the bell-crank plate D' upon its pivot C', and thereby throw the latch-plate Y forward and disengage its rear end from the shoulder B' of the plate A', thus uncoupling the rock-shaft and segment and permitting the latter to come to rest at the point determined by the particular key which has been pressed in, while the shaft and plate A' move on backward to normal position. The inner guide-plate V of each set of keys has secured to or formed upon it a flange provided with notches H' along its curved inner edge, and the front end of the latch-plate Y is shaped to fit these notches when thrown forward to uncouple the segment from the rock-shaft in the manner above described, and as the plate Y is locked in its forward position by the curved forward edge of the plate A' as soon as its disengagement from the shoulder B' is effected it follows that the coöperation of the front end of the latch-plate Y with the notches H' serves to positively lock the segment in the exact position at which it was uncoupled from the rock-shaft, as seen in Fig. 4, and to hold it in such position until at the next forward movement of the rock-shaft the shoulder B' of the plate A' is carried beneath the rear end of the plate Y and the latter is again moved rearward by the springs, whereupon its front end will be disengaged from the notch H', in which it had been resting, so that the segment is free to move forward to initial position with the rock-shaft.

Formed integral with the lower rear end of each plate A' or otherwise made fast upon the shaft H is an arm I', bent laterally, so that its rear end stands in the same vertical plane as the rear arm of the segment I. The distance between the upper side of the rear end of this arm and the rear edge of the segment-arm is such that the arm I' will contact with the rear edge of the segment-arm just as the shoulder B' of the plate A' clears the rear end of the latch-plate Y, so that as soon as said latch-plate has been moved rearward by the springs the segment will be positively moved forward by the rock-shaft. By this means during the first half of each operation of the machine all of the segments which have been operated at the preceding operation will be carried forward to initial position and the indicator-wheels caused to present their ciphers at the indicating-points.

For the purpose of holding any key in its inner position after it has been pressed in the keys are provided with notches, which coöperate with lugs upon a detent-plate J', supported by radial arms upon the rock-shaft H, there being one of these plates for each row of keys, constructed and arranged to coöperate therewith in the manner shown and described in detail in the aforesaid pending application of Joseph P. Cleal. Mounted beside each of the plates A' is a sliding latch-plate R', supported at its rear end upon the shaft H and at its front end upon a screw S', entering the framework, and pulled rearward by a spring T'. Each of these latch-plates R' coöperates with the lower end of one of the detent-plates J', the latter normally engaging a shoulder upon the upper edge of the front end of the plate R', as seen in Fig. 3, to hold the latter from rearward movement under the influence of its spring T' until the detent-plate is lifted by pressing in some one of the keys T. Each plate R' has secured upon its side adjacent the plate A' and segment an upwardly-extending plate U', adapted to coöperate with a stud V' upon the side of the latch-plate Y. When the parts are in the position shown in Fig. 3, the engagement of the plate U' with the stud V' will hold the plate Y from rearward movement even when the plate A' has moved forward until the shoulder B' has cleared the rear end of the plate, so that while the plate Y is held in this position no coupling of the rock-shaft to the segment can be effected. When any key in the series is pressed in, however, and the detent-plate J' thereby lifted and its lower end disengaged from the shoulder of the sliding plate R', the latter will be pulled rearward by its spring T' and the plate U' be carried away from the stud V', as in Fig. 4, so that the latch-plate Y is then free to move rearward as soon as the shoulder B' of the plate A' has been carried below its rear end. The result of this provision is that when no key in any row has been pressed in the segment corresponding to such row of keys will not be coupled to the rock-shaft at the end of the forward movement of the latter and will remain at rest, while if a key in the row has been pressed in such coupling will be effected. At the resetting of the segments, during the first half of the operation of the machine, the studs V' upon the latch-plate Y will contact with the upper forward corners of the plates U' just before the segments have reached their forward limit of movement, and the latches will be forced forward as the studs ride over said plates and the rear ends of the latches be thereby disengaged from the shoulders B' of the plates A'. This is the operation assuming that no key in any row has been pressed in, but if a key in any given row has been pressed in, as of course will be the case in the ordinary operation of the machine, then the sliding plate R' corresponding to such row will have been pulled rearward by its spring T' and its plate U' have been carried so far rearward that it will not serve to disengage the latch Y from the shoulder B' at the end of the forward movement of the parts, and the segment will therefore remain coupled to the rock-shaft and be carried backward by it. If, therefore, at two or more succeeding operations of the machine keys in the same row are operated, the segment and rock-shaft will not be uncoupled at the end of the resetting movement of the segment, the segment at each operation being simply picked up by the rock-shaft and carried forward to initial position by it, and then carried backward by it until disengaged by the operated key.

For the purpose of positively retaining in initial position such segments as are not coupled to the rock-shaft and to prevent their being accidentally moved backward by frictional connection or otherwise the plate U' is provided with a shoulder or hook, and the upper half of the stud V' upon the latch-plate is cut away to form a flat locking-surface to coöperate with such shoulder or hook. The result is that at the resetting of a segment corresponding to a row of keys in which no key has been pressed in the segment will not only be uncoupled from the rock-shaft, but will be positively locked in initial position, as in Fig. 3.

The purpose of pivoting the trip F' upon the plate D' instead of rigidly securing it thereto or providing the plate with a simple projection to contact with the operated key is to permit the resetting movement of the segment after a key below the latch-plate has been pressed in, the trip yielding when it strikes such key and slipping over it. But for this the trip might be dispensed with and the front end of the plate D' be made to contact directly with the keys. There may be substituted for the trip a spring-arm, such as that shown and described in the Cleal application, secured to the plate D' and arranged to contact positively with pins upon the keys in one direction and to yield and slip over them in the other, as may be readily understood without illustration here.

Near the end of each operation of the machine all the plates R' are thrown forward to normal position, permitting the detent-plates J' to drop behind the shoulders upon the plates R' and release the operated keys, by cams or other projections Y', fast upon the rock-shaft, which projections contact with studs Z' upon the plates R' and force them forward.

The general results above described of coupling the rock-shaft to the segments and uncoupling them therefrom at different points by the operated keys and of returning the segments to initial position at each operation and uncoupling such of them as correspond to rows of keys in which no keys have been operated have been accomplished in the prior machines heretofore referred to, and our invention in this respect relates to the novel and improved means for accomplishing such old results.

For the purpose of positively disconnecting each segment from the rock-shaft at the limit of backward movement of the segment, in case by any chance a segment should remain coupled to the rock-shaft and no key be in position to disengage it therefrom, each of the inner guide-plates V has secured upon its side adjacent the uppermost key in the row a plate W', whose lower end stands in the path of travel of the front end of a plate X', secured upon the side of the bell-crank D', heretofore described. In case the segment is not uncoupled from the rock-shaft by the engagement of the inner end of some key with the trip F' upon the front end of the plate D' in the manner heretofore described, then the contact of the plate X' with the lower end of the plate W' at the limit of the backward movement of the segment will effect such uncoupling.

From the foregoing description it will be understood that when a key in any set is pressed in and the operating-handle then given a complete revolution the segment I corresponding to such set of keys will be coupled to the rock-shaft H and be carried backward with said shaft a distance proportionate to the position and value of the operated key, and that such backward movement of the segment will turn the corresponding indicator-wheels to expose to view at the front and rear of the machine indicating-numbers representing the value of such key. Such backward movement of the segment will also be transmitted to the registering mechanism to add the value of the operated key thereon, and that mechanism and the means for transmitting the movements of the segments to it, embodying another feature of our invention, may be next described, reference being had more particularly to Figs. 3, 4, 5, and 6.

The registering-wheels are mounted upon a rotary shaft $B^2$, extending entirely across the machine in front of the shaft E and journaled at its opposite ends in the framework of the machine. There are in this instance seven registering-wheels mounted upon the shaft $B^2$, of which the right-hand one C' is adapted to register units of cents and coöperates with the right-hand set of keys and associated mechanism, the second one $C^2$ registers tens of cents and coöperates with the second set of keys, the third one $C^3$ registers units of dollars and coöperates with the third set of keys, the fourth one $C^4$ registers tens of dollars and coöperates with the ten-dollar key of the fourth set, while the fifth, sixth, and seventh wheels register, respectively, hundreds, thousands, and tens of thousands of dollars and are actuated from the wheel $C^4$ by suitable transfer devices. The four wheels C' to $C^4$ are driven by the respective segments I, with which they are thrown into and out of gear for that purpose. In the machines of this character shown and described in the two patents heretofore referred to there was a pinion for each registering-wheel mounted upon the shaft $B^2$, which pinion was in constant gear with one of the segments I, so as to be turned backward and forward at the movements of the segment, and a ratchet-and-pawl connection was interposed between the pinion and registering-wheel to cause the latter to be turned in one direction by the pinion and segment, but not in the other. In the present machine we have provided means for positively throwing the registering-wheels into and out of gear with the segments, so that they are in gear with them during the backward indicating and registering movements of the segments and out of gear with them during their forward resetting movements, and the ratchet-and-pawl connections above referred to are thereby dispensed with. This new mode of operation and the means for accomplishing it constitute one of the features of our invention relating to the registering mechanism of the machine.

Loosely mounted upon the shaft $B^2$ (or upon the extended hubs of the registering-wheels) are four pinions $D^2$, one for each of the four registering-wheels C' to $C^4$, Figs. 5 and 6. These four pinions are permanently geared, directly or indirectly, to the respective gears J, which mesh with the respective segments I, as heretofore described, Figs. 3 and 4. The pinions which are located in line with their coöperating gears J mesh directly with such gears, while those which are not in line mesh with segments $E^2$, fast upon the hubs or sleeves of the gears J, as in the case of the one shown in Figs. 3 and 4. The pinions $D^2$ are thus turned forward and backward by the movements of the segments I. Each pinion $D^2$ has fast upon its side a smaller pinion $F^2$, and fitting against the same is a pinion $G^2$, fast upon the hub or sleeve of the registering-wheel which is to be actuated by such pinion $D^2$. The pinions $F^2$ and $G^2$ being loose upon the shaft $B^2$ and free to turn independently of each other, it follows that the movements of the pinions $D^2$ $F^2$ will have no effect upon the pinions $G^2$ and registering-wheels unless the pinions $D^2$ $F^2$ be in some manner connected to the pinions $G^2$. For the purpose of effecting this connection there are provided four smaller pinions $H^2$, mounted upon arms $I^2$, fast upon and projecting upwardly from a rock-shaft $J^2$, extending across the machine below and in front of the train of wheels upon the shaft $B^2$. One of the pinions $H^2$ is located adjacent each of the pinions $D^2$, immediately in front of the pinions $F^2 G^2$ beside such pinion $D^2$, and the pinion $H^2$ is sufficiently wide to mesh with both the pinion $F^2$, Fig. 5, and the pinion $G^2$ when thrown rearward into engagement therewith by rocking the shaft $J^2$. (It should perhaps be mentioned that in Fig. 3 pinion $H^2$ is not in mesh with the pinion $D^2$, though the position of the parts makes it appear so in the drawing. The pinion $H^2$ is beyond the pinion $D^2$ in said view, at the left of the latter pinion, and when thrown rearward into mesh with the pinions $F^2 G^2$ passes behind the pinion $D^2$, Fig. 4.)

From the foregoing description it will be understood that so long as the pinions $H^2$ remain in their forward position shown in Fig. 3 the pinions $D^2$ will remain disengaged from their respective registering-wheels and be idly turned by the gears J and segments, but when the shaft $J^2$ is rocked and the pinions $H^2$ are thrown rearward into mesh with the respective pairs of pinions $F^2 G^2$, as in Fig. 4, the pinions $D^2$ will be thereby connected with the pinions $G^2$ and registering-wheels, so that the registering-wheels will be positively geared to the segments I and the movements of the latter be transmitted to them. The rock-shaft $J^2$ has secured to it a depending arm $L^2$, Figs. 3 and 4, to which is pivoted the front end of an arm $M^2$, whose rear end is slotted and embraces the rotary shaft G, heretofore described. A cam $O^2$, fast upon the shaft G, coöperates with a pin $P^2$ upon the side of the arm $M^2$ to throw said arm forward and backward at each operation of the machine and revolution of the shaft G, and the adjustment of the parts is such that the arm $M^2$ will be thrown forward at the beginning of a backward movement of the rock-shaft H to carry the pinions $H^2$ into mesh with the pinions $F^2 G^2$, so that the backward movements of any of the segments I will be transmitted to the corresponding registering-wheels. Before the rock-shaft H has completed its backward movement, but after the segments I have been given their complete backward movements, the cam $O^2$ will draw the arm $M^2$ rearward again and disengage the pinions $H^2$ from the pinions $F^2 G^2$, and they will remain so disengaged during the forward movement of the rock-shaft and forward resetting movement of the segments I at the next operation of the machine. In this manner and by this means the registering-wheels are thrown into gear with the segments at the beginning of the registering movements of the latter and out of gear with them at the end of their registering movements, so that during the time the wheels are to be actuated by the segments they are positively geared to them, while during the time they are not to be actuated by the segments they are wholly disconnected from them.

It will of course be understood that by making the pinions $G^2$ of the same size as the pinions $D^2$ and locating the pinions $H^2$ a little farther forward in their normal position the pinions $F^2$ might be dispensed with and the pinions $G^2$ be placed directly against their respective coöperating pinions $D^2$, the employment of the pinions $F^2$ in the machine shown in the drawings being simply a matter of convenience in construction. Again, if the construction of the machine were such as to conveniently permit such arrangement the pinions $D^2 F^2$ might both be dispensed with and the pinions $G^2$ be arranged in such relation to the gears J or segments I as to permit the idle-pinions $H^2$ to mesh directly with the gears J or segments I and the pinions $G^2$, with the same result.

For the purpose of locking the pinions $H^2$ from turning while in their forward positions and holding them in proper position to mesh with the pinions $F^2 D^2$ when thrown rearward there are provided a series of fixed locking arms or dogs $Q^2$, fast upon a fixed shaft $R^2$ and adapted to engage the pinions $H^2$ when the latter are thrown forward and lock the same, Fig. 3.

The transfers between the registering-wheels $C'$, $C^2$, $C^3$, and $C^4$ are effected by substantially the same devices as those shown and described in Patent No. 464,294, heretofore referred to, and need not be shown and described in this case, nor need the transfers between the wheel $C^4$ and the three supplemental registering-wheels at its left, which may be of any suitable form.

As seen in Figs. 1 and 2, the fourth or left-hand set of keys contains only one cash-key, which is the uppermost one in the set, and represents ten dollars. The remaining keys bear letters of the alphabet, which are used to represent either the different salesmen who operate the machine or different classes of sales, as is common in the use of machines of this character. The indicator-wheels K and $K^7$ are numbered and lettered to correspond to the keys in this set, and all of the keys coöperate with said wheels, so that when any key in the set is pressed in and the operating-handle given a revolution the indicator-wheels K $K^7$ will expose at the indicating-point the letter or number corresponding to that upon the key. These indicator-wheels are therefore geared to the fourth or left-hand segment in the same manner that the other wheels are geared to the other segments, but inasmuch as only one key in the set coöperates with the registering mechanism provision must be made for transmitting motion from the segment to the registering mechanism only when the uppermost key in the set, representing ten dollars, is operated. To that end the segment E² which meshes with the pinion D² which drives the fourth registering-wheel C⁴, Fig. 4ª, has all of its teeth cut away excepting a few at its extreme rear end. This segment is fast upon the hub or sleeve of the fourth or left-hand gear J, which meshes with the fourth segment I at the extreme left side of the machine. When said segment moves backward, the gear J and segment E² will be turned forward by it without moving the pinion D² until the segment I has nearly completed its backward movement, whereupon the teeth at the upper rear end of the segment E² will engage the pinion D² and turn it one-tenth of a revolution before the segment I is disconnected from the rock-shaft H by the ten-dollar key and comes to rest, thus turning the registering-wheel C⁴ one-tenth of a revolution and adding ten dollars upon it.

At the next operation of the machine and forward movement of the segment I the segment E² as it moves out of engagement with the pinion D² will turn the latter backward one-tenth of a revolution to normal position. In this manner and by this means the segment I is caused to transmit all of its movements to the indicator-wheels, but to coöperate with the ten-dollar registering-wheel only when the ten-dollar key is operated. In the present instance the pinion D² has a circular disk D¹⁰ secured to or formed integral with it upon one side, whose periphery is flush with the ends of the teeth of the pinion and has its rear side cut away to fit against the edge of a curved plate E⁴, secured upon the side of the segment E². The disk D¹⁰ is thus locked against the plate E⁴ and the pinion D² held from turning until, in the forward and downward movement of the segment and plate, the rear end of the latter, which terminates in front of the teeth upon the rear end of the segment, passes below the notch or cut-away space in the disk D¹⁰, at which moment the teeth upon the segment engage the pinion D² and turn the same. In the backward movement of the parts the disk D¹⁰ is returned to the position shown in the drawings by the time the teeth upon the segment clear the teeth upon the pinion, so that the latter is always locked from movement except when engaged by the teeth upon the segment.

It will of course be understood that more than one cash-key might be employed in the bank, in which case the segments E² would have an additional number of teeth, according to the number of additional cash-keys employed. Thus if the bank contained six character-keys and three cash-keys the segment would have a sufficient number of teeth to cause it to engage the pinion D² when it had completed six tenths of its stroke, so that during the seventh, eighth, and ninth tenths of its stroke it would actuate the registering-wheel in case the upper key were the one set. If the lowest one of the three keys were the one set, then the segment would actuate the wheel during only the seventh tenth of its stroke, while if the second key were set it would actuate the wheel during the seventh and eighth tenths of its stroke. In such case the lowest cash-key would in the present instance represent ten dollars, the second twenty dollars, and the upper one thirty dollars, as will be readily understood. The curved locking-plate E⁴, coöperating with the disk D¹⁰, would of course be sufficiently shortened to permit the segment to turn the pinion D² as soon as they became engaged.

The remaining feature of our invention relates to the printing attachment and the means for automatically ejecting the printed checks. The gears J, which mesh with the segments and drive the indicators and registers, are secured upon the right-hand ends of concentric sleeves A³, free to turn independently upon the shaft E. The shaft and sleeves extend through and project beyond the left-hand side of the machine and have fast upon their respective outer ends the type-carriers V⁴, Figs. 2 and 9, as shown and described in detail in the aforesaid patent, No. 483,511, and the pending application of Joseph P. Cleal. These type-carriers are arranged within a supplemental frame B³, which has upon its outer or left-hand side an inclined guideway C³, Figs. 7 and 9, in which is fitted to slide a bar or plate D³, carrying at its lower end a plate E³, projecting to the right beneath the type-carriers at right angles to the plate D³, Figs. 7 and 10. The plate E³ carries the platen F³, by which the paper strips led over the platen are pressed against the type-carriers to effect the printing. The shaft E extends through a slot in the plate D³ and has fast upon its outer end a disk G³, Figs. 2 and 7 and dotted lines, Fig. 9, which disk has formed in its inner side, adjacent the plate D³, a cam-groove in which fits a stud H³, projecting from the sliding plate D³, mounted in the inclined guideway, the revolution of the shaft E thus reciprocating the plate D³ and carrying the platen F³ upward against and downward away from the type-carriers, as fully shown and described in Patent No. 483,511.

Figure 10:
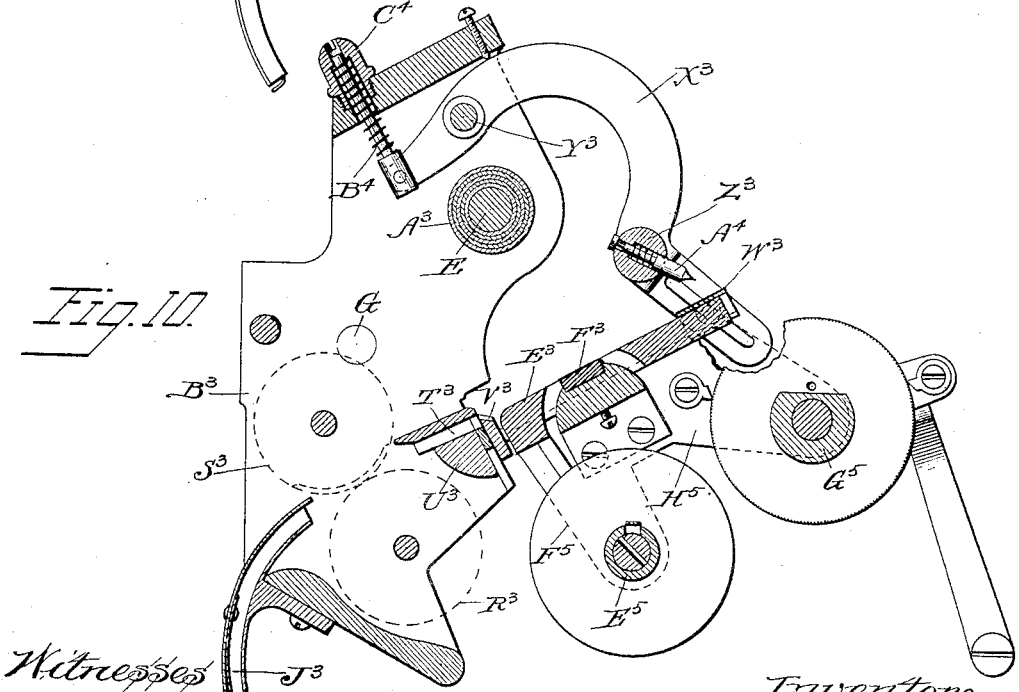

There are two paper strips led between the type-carriers and platen, the upper strip, from which the printed checks are formed, being carried in a suitably-supported roll I³, Fig. 2, and led thence rearward into a guideway J³, carried by the frame B³, thence passing upward and forward between a pair of feed-rollers R³ S³, Figs. 9 and 10, thence forward through a narrow slot T³ in a cross-piece U³ of the frame B³, and thence forward over the plate E³ and platen F³. The feed-rollers R³ S³ are geared to the shaft E, so that at each revolution of the latter a given length of the strip is fed forward over the plate E³ while the latter is in its lower position. When it is then lifted to its highest position, it carries the strip against the type-carriers and effects the printing, while a knife V³, secured to the rear end of the plate E³, severs the printed check from the strip against the front side of the cross-piece $U^3$, containing the guideway $T^3$.

The detached printed check thus formed may be removed from the plate $E^3$ by hand, but we have devised a novel ejector for automatically removing the check, which may be now described. Mounted to slide backwardly and forwardly upon the right-hand inner edge of the plate $E^3$ is a plate $W^3$, Figs. 7 to 10, whose upper horizontal portion overlaps the top of the plate $E^3$ some distance and slides upon it, the plate $E^3$ having a depression formed in its upper side to accommodate the overlapping portion of the plate $W^3$. The plate $W^3$ has projecting laterally from its outer side a stud which fits in a long slot in the lower end of a curved lever $X^3$, fast upon a rock-shaft $Y^3$, mounted in the frame $B^3$. Mounted in a bearing $Z^3$ upon the left side of the lever $X^3$ at the upper end of the slot therein is a sliding rod or pin $A^4$, surrounded within the bearing by a coiled spring pressing against a shoulder upon the rod and yieldingly holding it in its normal position. (Shown in Fig. 10.) The front end of the rod $A^4$ stands over the plate $W^3$ and is widened and serrated for a purpose to be explained.

It will be seen that if the lower forward end of the lever $X^3$ be moved rearward the serrated end of the rod $A^4$, moving in the arc of a circle struck from the pivot $Y^3$ of the lever, will engage the upper side of the plate $W^3$, after which any further rearward movement of the lever will cause the rod $A^4$ to be forced upward into the bearing $Z^3$ against the resistance of the spring surrounding it in such bearing. Such rearward movement of the parts will therefore cause the rod $A^4$ and plate $W^3$ to grip anything placed between them, and if they are then thrown quickly forward they will carry such object with them until they separate as they reach normal position. Now the front end of the paper strip as it is advanced by the feed-rollers $R^3 S^3$ at each operation of the machine passes over the plate $W^3$, and by means hereinafter described the lower end of the lever $X^3$ is moved rearward as the plate $E^3$ is being lifted to carry the platen $F^3$ against the type-carriers and cause the knife $V^3$ to sever the check, and after the printing has been effected and the check severed from the strip the lower end of the lever $X^3$ is thrown quickly forward, causing the rod $A^4$ and plate $W^3$, which have gripped the check between them, to carry the check forward and eject it from the machine. The upper rear end of the lever $X^3$ has pivoted to it the lower end of a rod $B^4$, whose upper end passes through a screw-cap $C^4$, which serves to confine a coiled spring surrounding the rod. When the front end of the lever $X^3$ is moved rearward, as above described, this spring will be compressed, so that when the lever is released its front end will be quickly thrown forward to eject the check. By providing means for positively moving the lever rearward against the stress of the spring and then releasing it at the proper time, an operative automatic ejector would be produced, but we have provided means for positively moving the lever in both directions, and employ the spring merely as an auxiliary device, as hereinafter explained.

As before stated, the lever $X^3$ is fast upon the rock-shaft $Y^3$, and the latter has fastened upon it near its left-hand end, just within the outer wall of the frame $B^3$, a rearwardly-projecting arm $D^4$, Figs. 7 and 8. Pivoted at $E^6$ to a stud upon the framework is a short lever $F^4$, whose front end overlies and rests upon the arm $D^4$. The shaft E has fast upon it a gear $G^4$, which meshes with a second gear $H^4$, which in turn meshes with a third gear $I^4$, and the latter has upon its side a laterally-projecting stud $I^5$, adapted, in the revolution of the gear, to contact with the rear end of the lever $F^4$ and rock the latter upon its pivot as it passes by and clears the end of the lever. The shaft E also has fast upon it a snail-cam $J^4$, adapted to coöperate with the arm $D^4$ upon the rock-shaft $Y^3$.

Under this construction and arrangement the operation of the parts is as follows: At each operation of the machine and revolution of the shaft E the cam $J^4$ will ride under the rear end of the arm $D^4$ and lift it, thereby rocking the shaft $Y^3$ and throwing the lower end of the ejector-lever $X^3$ rearward and cause the gripping devices to take hold of the check. Just as the tail of the cam $J^4$ clears the end of the arm $D^4$ the stud upon the gear $I^4$ will contact with the rear end of the lever $F^4$ and throw it upward, forcing its front end downward and causing it to depress the arm $D^4$ and rock the shaft $Y^3$ and throw the lower end of the lever $X^3$ forward to eject the check. In this manner and by this means the ejector-lever is positively moved in both directions and a spring action not depended upon, as heretofore. The purpose of employing the spring surrounding the rod $B^4$, heretofore described, is this: If the machine should be operated very slowly, the lower end of the lever $X^3$ might be moved forward so slowly as to simply carry the printed check with it until the latter was released by the gripping devices, instead of causing it to be thrown still further forward by the momentum of the parts, as is desirable. In such case the spring will impart a quicker movement to the lever and cause the check to be properly ejected, but under the usual operation of the machine the lever $X^3$ will be positively thrown forward with sufficient speed to properly eject the check, in which case the spring performs no essential part of the operation.

We are aware that spring-actuated ejectors applied to a machine of this character are old, and the novelty of our invention in this respect consists in the provision of a positively-operated ejector and in the novel construction and arrangement of the parts to that end.

A suitable receptacle or hood (not shown) is placed in front of the printing and ejecting mechanism to receive the printed checks as they are thrown out. The roll I³ of the check-strip is supported upon a stub-shaft A⁵, projecting from the side of the machine, Fig. 2, and held in place thereon by a segmental guard-plate B⁵, pivoted at its lower forward corner to a shield C⁵, secured to the framework. By throwing this guard-plate forward the roll I³ may be slipped off the shaft A⁵ or a new roll placed thereon, and upon then throwing the guard-plate B⁵ backward it will be held by gravity in normal position.

As before stated, there are two paper strips led over the type-carriers and impression-platen, the second of which is a record-strip D⁵, Figs. 2 and 9, which is carried upon a supply-roll E⁵, supported by a bracket F⁵, depending from the plate E³ and led thence upward through a slot in the plate E³, across the platen F³, and thence downward through a second slot in the plate E³ and wound around a storage-reel G⁵, supported upon a second bracket extending forward and downward from the plate E⁵ and automatically actuated by means described in Patent No. 483,511 to draw forward the paper strip a given distance at each operation of the machine. The slots in the plate E³ at front and rear of the platen F³ extend outward through the edge of the plate, as seen in Fig. 9, so that in placing a fresh supply of record-strip in the machine it may be slipped bodily sidewise over the platen and does not have to be threaded endwise through slots in front and in rear of the same, as heretofore. There is provided a guard-plate I⁵, pivoted at its front end to the plate D³ and provided near its lower end with a notch adapted to fit over a stud J⁵. When the strip is to be removed or inserted, the lower end of this guard-plate is pulled forward by means of a knob L⁵, Fig. 2, and after the strip has been removed or inserted the plate is pushed rearward and its notch engaged with the stud J⁵. To yieldingly hold the plate I⁵ in its rearward position, there is confined in a housing upon the front edge of the frame B³ or guideway C³ a spring-plunger M⁵, whose outer end is beveled, as shown, and stands in the path of the plate I⁵. When the plate is swung forward, it rides over the beveled edge of the plunger and forces the latter into its housing, and the engagement of the plunger with the inner side of the plate yieldingly holds the latter in forward position while the strip is being removed or inserted, and when the plate is swung rearward again the plunger springs outward and yieldingly holds the plate in normal position. The cam-groove in the disk G³, by which the impression-platen is actuated, is so shaped, as shown and described in Patent No. 483,511, that the platen is given two impressing movements at each operation of the machine, the first effecting the printing upon the paper strip or check, after which the check is automatically ejected by the means described, and then before the strip is advanced for the next check the platen is given its second movement to effect the printing upon the lower or record strip, as fully described in the aforesaid patent.

Having thus fully described our invention, we claim—

1. The combination of the keys T, segment I, sliding plate Y upon the segment I, bell-crank plate D' pivoted to the segment and connected to the plate Y and coöperating at its forward end with the keys T, the oscillatory plate A' having the shoulder B' coöperating with the plate Y, and a spring pressing the plate Y toward the plate A', substantially as described.

2. The combination of the keys T, segment I, sliding plate Y upon the segment I, bell-crank plate D' pivoted to the segment and connected to the plate Y, and having a yielding projection at its forward end adapted to contact positively with the operated key in one direction and yield and slip by it in the other, the oscillatory plate A' having the shoulder B' adapted to coöperate with the plate Y, and a spring pressing the plate Y toward the plate A', substantially as described.

3. The combination of the keys T, the segment I, sliding plate Y upon the segment I, bell-crank plate D' pivoted to the segment and connected to the plate Y, trip F' pivoted to the front end of the plate D' and adapted to coöperate with the keys T, the oscillatory plate A' having the shoulder B' adapted to coöperate with the plate Y, and a spring pressing the plate Y toward the plate A', substantially as described.

4. The combination of the keys T, the segment I having a guideway X, the sliding plate Y mounted therein, the bell-crank plate D' pivoted to the segment and having its upper end pivoted to the plate Y, the spring-pressed trip F' pivoted to the front end of the plate D' and coöperating with the keys T, the oscillatory plate A' having the shoulder B' adapted to coöperate with the plate Y, and a spring pressing the plate Y toward the plate A', substantially as described.

5. The combination of the keys Y, the curved plate V adjacent their inner ends and having the notches H' along its inner edge, the segment I, the sliding plate Y mounted upon the segment and adapted to coöperate at its outer end with the notches H', the bell-crank plate D' pivoted to the segment and connected to the plate Y and adapted to coöperate at its forward end with the keys T, the oscillatory plate A' having the shoulder B' adapted to coöperate with the inner end of the plate Y, and a spring pressing the plate Y toward the plate A', substantially as described.

6. The combination of the keys T, the detent-plate J' coöperating therewith, the spring-pressed sliding plate R' coöperating with the plate J' and having the upwardly-projecting portion or plate U', the segment I, the sliding plate Y mounted thereon and having the stud V' to coöperate with the plate U', the bell-crank plate D' pivoted to the segment and connected to the plate Y and coöperating at its forward end with the keys T, the oscillatory plate A' having the shoulder B' to coöperate with the inner end of the plate Y, and a spring pressing the plate Y toward the plate A', substantially as described.

7. The combination of the keys T, the detent-plate J' coöperating therewith and lifted by pressing in any key, the spring-pressed sliding plate R' coöperating with the lower end of the plate J' and provided with the upwardly-projecting plate U' having a hook or shoulder upon its forward edge, the segment I, the sliding plate Y mounted thereon and having the stud V' shaped to coöperate with the plate U' and its hook or shoulder, the bell-crank plate D' pivoted to the segment and connected to the plate Y and coöperating at its forward end with the keys T, the oscillatory plate A' having the shoulder B' to coöperate with the plate Y, and a spring pressing the plate Y toward the plate A', substantially as described.

8. In a registering-machine, the combination, with a driving mechanism, an oscillatory segment, and means for connecting the segment with and disconnecting it from the driving mechanism and determining the extent of movement imparted to it, of a registering-wheel, an idle-pinion, and means actuated by the driving mechanism for throwing the pinion into and out of gear with the registering-wheel and segment at certain fixed points in the movement of the driving mechanism, to gear them together and ungear them, for the purpose described.

9. In a registering-machine, the combination, with a driving mechanism, an oscillatory segment, and means for connecting the segment with and disconnecting it from the driving mechanism and determining the extent of movement imparted to it, of a registering-wheel, a pinion turning therewith, a second pinion in constant gear with the segment, an idle-pinion, and a cam actuated by the driving mechanism and coöperating with the idle-pinion for throwing it into and out of gear with the two first-mentioned pinions, to gear the registering-wheel to the segment and ungear them, for the purpose described.

10. In a registering-machine, the combination, with a driving mechanism, a series of oscillatory segments, and means for connecting the segments with and disconnecting them from the driving mechanism and determining the extent of movement imparted to them, of a series of registering-wheels, one for each segment, a series of idle-pinions, one for each registering-wheel and segment, mounted in a movable frame, and a cam actuated by the driving mechanism and coöperating with the movable frame for throwing the idle-pinions into and out of gear with their respective registering-wheels and segments, to gear the wheels to and ungear them from the segments, for the purpose described.

11. In a registering-machine, the combination, with a driving mechanism, a series of oscillatory segments, and means for connecting the segments with and disconnecting them from the driving mechanism and determining the extent of movement imparted to them, of a series of registering-wheels, one for each segment, a rock-shaft having a series of arms fast upon it, a series of idle-pinions mounted on said arms, one pinion for each wheel and its coöperating segment, and means actuated by the driving mechanism for rocking said shaft to throw the pinions into and out of gear with their respective registering-wheels and segments, to gear the wheels to and ungear them from the segments, for the purpose described.

12. In a registering-machine, the combination, with the rock-shaft of the driving mechanism, the segments loose thereon, means for connecting the segments with and disconnecting them from the rock-shaft and determining the movement imparted to them by the rock-shaft, of a series of registering-wheels, one for each segment, a series of idle-pinions, one for each registering-wheel and its segment, and a cam actuated by the driving mechanism and coöperating with the idle-pinions for throwing the pinions into and out of gear with their respective registering-wheels and segments, to gear the wheels to and ungear them from the segments, for the purpose described.

13. In a registering-machine, the combination, with the rock-shaft of the driving mechanism, the segments loose thereon, means for connecting the segments with and disconnecting them from the rock-shaft, and a series of sets of keys for determining the movement imparted by the rock-shaft to the respective segments, of a series of registering-wheels, one for each segment, a series of idle-pinions, one for each registering-wheel and its coöperating segment, mounted in a rocking or swinging frame, and a cam actuated by the driving mechanism and connected to the rocking frame for throwing the pinions into and out of gear with their respective registering-wheels and segments, for the purpose described.

14. In a registering-machine, the combination of an oscillatory gear wheel or segment, a driving mechanism for imparting different degrees of movement thereto proportionate to the amount to be registered, a registering-wheel to be turned by the segment during its movement in one direction but not in the other, an idle-pinion, and a rotary cam actuated by the driving mechanism for throwing the pinion into and out of gear with the registering-wheels and segment, to gear them together and ungear them, for the purpose described.

15. In an indicating and registering machine, the combination of a driving mechanism, an oscillatory segment, means for intermittently connecting and disconnecting them, a single bank of keys coöperating with such means to control the extent of movement imparted by the driving mechanism to the segment, said single bank containing both cash and character or special keys, an indicator geared to the segment and partaking of all its movements, a registering-wheel, a driving-pinion therefor, and a segment-gear turning with the indicator and meshing with said driving-pinion during only a portion of the movement of the indicator, substantially as and for the purpose described.

16. In a cash-register, the combination of a series of keys representing different values, a type-carrier adapted to print said values, a platen coöperating with the carrier, means for moving a paper strip past the printing-point, means for severing it into detached checks, a reciprocating ejector for automatically ejecting the printed check, and means actuated by the driving mechanism of the machine for positively moving said ejector in both directions, substantially as described.

17. In a cash-register, the combination of a series of keys representing different values, a type-carrier adapted to print said values, a platen coöperating with the carrier, means for moving a paper strip past the printing-point, means for severing it into detached checks, a reciprocating ejector for automatically ejecting the printed check, and two rotary cams actuated by the driving mechanism and coöperating with the ejector to move it positively in both directions, substantially as described.

18. In a cash-register, the combination, with a check-printing mechanism, of an ejector consisting of a reciprocating gripping device adapted to automatically grip the printed check when moved in one direction and to release it when moved in the other, and means actuated by the driving mechanism for positively moving said gripping device in opposite directions to cause it to grip the check and eject it from the machine, substantially as described.

19. In a cash-register, the combination, with the driving mechanism, a type-carrier, means for intermittently connecting the driving mechanism and type-carrier, a series of keys of different values for determining the degree of movement imparted by the driving mechanism to the type-carrier, and an impression-platen coöperating with the carrier, of a reciprocating ejector, and means actuated by the driving mechanism for positively moving said ejector in both directions to cause it to automatically eject the printed check, substantially as described.

20. In a cash-register, the combination, with the driving mechanism, a type-carrier, means for intermittently connecting the driving mechanism and type-carrier, a series of keys of different values for determining the degrees of movement imparted by the driving mechanism to the type-carrier, an impression-platen coöperating with the type-carrier, means for moving the paper check-strip between the type-carrier and platen, and means for cutting the strip into checks, of an ejector consisting of a reciprocating gripping device operating to grip the check when moved in one direction and to release it when moved in the other, and means actuated by the driving mechanism for positively moving said gripping device in opposite directions, to cause it to grip and eject the printed check, substantially as described.

21. In a machine such as described, the combination, with the reciprocating platen-supporting plate $E^3$ provided with slots in front and rear of the platen extending laterally through one edge of the plate, of the supply and storage reels $E^5$ $G^5$ carried by the plate $E^2$, and the record-strip $D^5$ wound upon said reels and adapted to be slipped sidewise over the platen, through the slots in the plate $E^3$, substantially as described.

22. In a machine such as described, the combination, with the reciprocating platen-supporting plate $E^3$ provided with slots in front and rear of the platen extending laterally through one edge of the plate, of the supply and storage reels $E^5$ $G^5$ carried by the plate $E^3$, the record-strip $D^5$ wound upon said reels and adapted to be slipped sidewise over the platen, through the slots in the plate $E^3$, and the pivoted guard-plate $I^5$ for preventing displacement of such strip, substantially as described.

23. In a cash-register, the combination, with the printing attachment and the support $A^5$ for the roll $I^3$ of the paper strip, of the pivoted gravitating guard-plate $B^5$ coöperating with the support $A^5$ to hold the roll $I^3$ in place, substantially as described.

JOSEPH P. CLEAL.
FRANK A. REINHARD.

Witnesses:
PEARL N. SIGLER,
ALVAN MACAULEY.